Oct. 30, 1962
C. B. WATTS, JR
3,061,780
POLAR DISPLAYER
Filed March 19, 1956
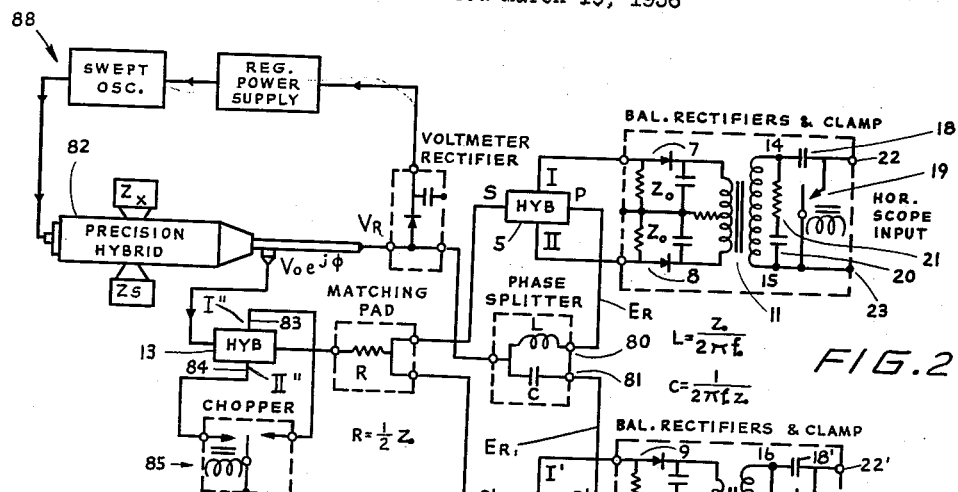
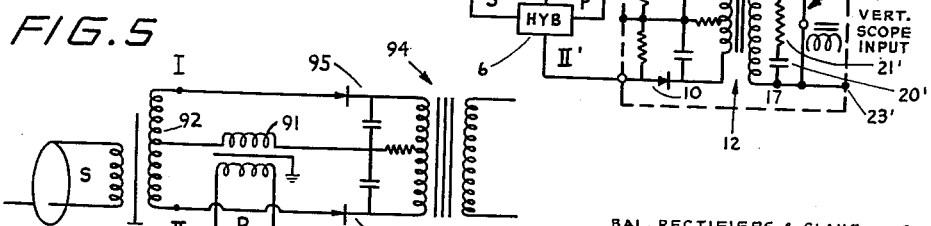
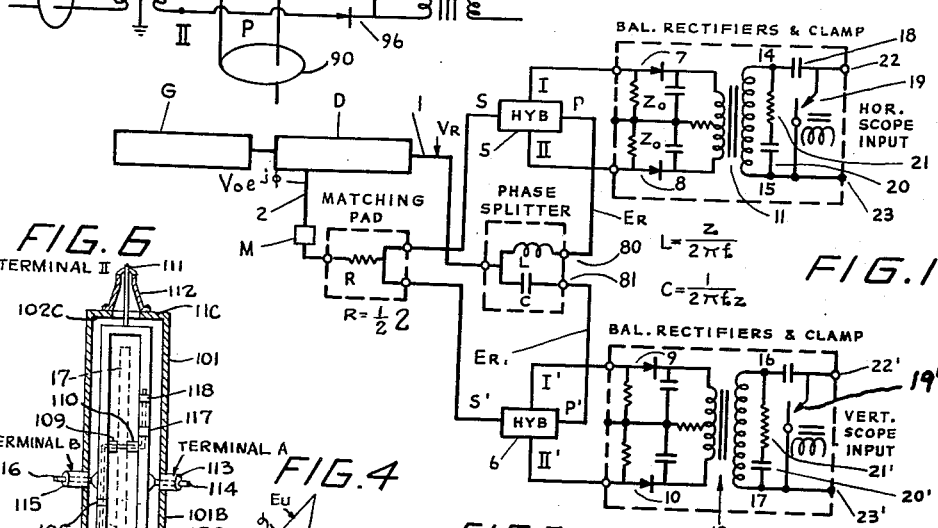
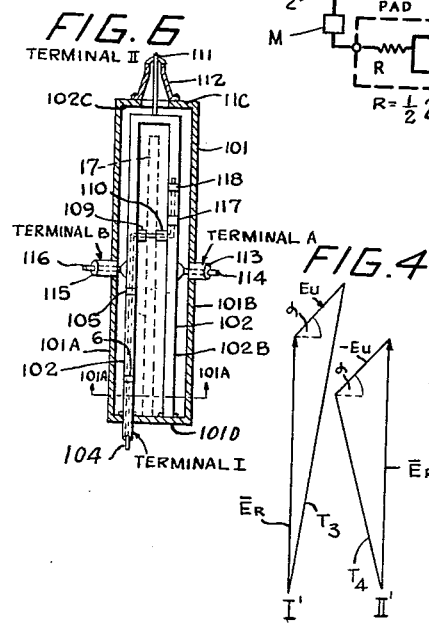
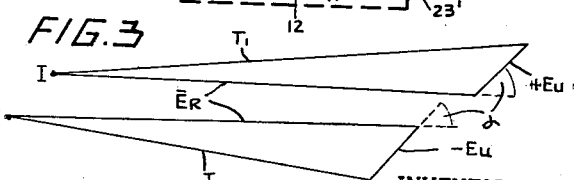
INVENTOR.
Chester B. Watts, Jr.
BY Ezekiel Wolf
his attorney

United States Patent Office 3,061,780
Patented Oct. 30, 1962

3,061,780
POLAR DISPLAYER
Chester B. Watts, Jr., Winchester, Mass., assignor to
Andrew Alford, Boston, Mass.
Filed Mar. 19, 1956, Ser. No. 572,469
19 Claims. (Cl. 324—84)

The present invention relates to a polar displayer and in particular to a means and method of representing in polar vector form an unknown radio frequency voltage relative to a reference voltage.

The present invention provides a means and method for representing in polar vector form, a radio frequency voltage in phase relation to a reference voltage. In the operation of the device, the unknown radio frequency voltage is converted into two low frequency voltages which are proportional to a pair of mutually perpendicular X, Y, components of the vector representing the R.F. voltage to be displayed. When these two low frequency voltages are presented as horizontal and vertical deflections of the luminous spot on a cathode ray tube screen or as a displacement of a pen on a two axis recorder, the result is essentially a visual representation of the R.F. voltage vector.

In the following specification we shall let $V_0 e^{j\phi}$ be the R.F. voltage vector. A means and method of obtaining a vectorial and magnitude representation of an unknown voltage is of considerable value in many applications, such as, but not limited to the determination of field strength of an antenna or the demonstration of magnitude and phase relations of voltages on a transmission line.

In the operation of this invention, two R.F. voltages are supplied to the polar displayer. One voltage $V_0 e^{j\phi}$ being the unknown voltage to be displayed, and a second voltage $V_R$ being the reference voltage with which the unknown is to be compared both in phase and magnitude. The phase of the reference voltage is normally taken as zero. These voltages are fed to a pair of hybrids with the reference voltage being fed to the junctions in 90° phase relation and the unknown voltage being preferably fed to the hybrid junctions as a modulated signal and through an impedance matching device, such as a matching pad. The output of each hybrid is then fed into a device which vectorially adds the outputs of each hybrid independently, and applies quantities which are proportional to the X and Y components of the unknown voltage to the input of a suitable detecting element such as an oscilloscope.

In the following description, the invention will be described in connection with the use of the polar displayer for visually representing the unknown voltage as a polar quantity on an oscilloscope. However, it should be understood that other types of visual representation may be made by suitable use of the X.Y. output signals of the polar displayer of this invention.

These and other objects of the present invention will be more clearly understood when considered in connection with the accompanying drawings, in which:

FIGURE 1 shows a schematic drawing of the present invention.

FIGURE 2 shows a schematic drawing of the present invention as used in combination with a precision hybrid for measuring an unknown R.F. voltage of this precision hybrid.

FIGURE 3 is a vectorial diagram of the voltages developed at the load terminals of hybrid 5.

FIGURE 4 is a vectorial diagram of the voltages developed at the load terminals of hybrid 6.

FIGURE 5 illustrates a portion of a modification of the invention, and

FIGURE 6 is a schematic diagram of a hybrid which may be used in the circuit.

Referring to FIGURE 1, there is shown a source of R.F. power G. This source supplies a device D which may be any type of network or circuit having at least two R.F. outputs such as 1 and 2. The unknown voltage $V_0 e^{j\phi}$ for purposes of explanation will be considered to appear at the output 2, while the reference voltage $V_R$ appears at the output 1. It is the intention of the present invention to display the voltage $V_0 e^{j\phi}$ as a vector voltage V, with respect to the reference voltage $V_R$. The phase of the reference voltage $V_R$ will be used as a phase standard. The magnitude of $V_R$ will not necessarily be used as a standard, although it could be used if desired. The reference voltage $V_R$ should preferably be large with respect to $V_0 e^{j\phi}$. If therefore this unknown voltage is comparatively large with respect to $V_R$, a suitable attenuator should be inserted in the line to the output 2 to reduce the magnitude of the unknown voltage with respect to $V_R$.

$V_R$ is first resolved into two mutually perpendicular vector components, $E_R$ and $R_{R'}$. This is obtained by feeding the voltage $V_R$ into a phase splitter as illustrated. This phase splitter comprises an inductance L and a capacitance C placed in series with two outputs 80 and 81. The voltage $V_R$ is fed into the phase splitter between the inductance and capacitance C. The outputs 80 and 81 of this phase splitter are fed respectively into hybrids 5 and 6. These hybrids are of the type shown in my copending application Serial No. 550,242, filed November 23, 1955. The principal terminology used herein with reference to hybrids is the same as that used in "Transmission Line Hybrids" published by the Alford Manufacturing Company, Inc. The outputs 80 and 81 may be fed into either the parallel P or series S branches of the hybrid.

In FIGURES 1 and 2 the phase splitter is fed into the parallel ends of the hybrids. In FIGURE 6, numeral 101 denotes an elongated metal cavity which could be, for example, of rectangular, round, or elliptical cross section. Within this cavity, and preferably symmetrically arranged with respect to the center line of the cavity, is placed a U-shaped conductor 102. The two ends of this U-shaped conductor are effectively connected to one of the short end walls of cavity 101; for example, the wall 101d of the elongated cavity. By "effective connection" is meant the type of connection which may or may not be effective for direct currents, but which presents a very low impedance at the frequencies at which the network is to be operated. For the purpose of description, it will be convenient to assign designations to three portions of the U-shaped conductor. The two substantially parallel legs of the conductor 102 will be referred to as legs 102A and 102B. The portion of conductor 102 through which legs 102A and 102B are interconnected will be referred to as conductor 102C. Leg 102A is made hollow: for example, leg 102A could be a round metal tube. Leg 102B could also be a round metal tube of the same diameter as leg 102A. In some cases leg 102B could be made solid but of the same outer diameter as leg 102A. Legs 102A and 102B are made round for convenience only. Under some circumstances, square cross sections may be found more convenient than round ones. If desired, rectangular cross sections, or elliptical cross sections could be used, although easy availability of material usually dictates that round or square sections be adopted.

Through the hollow, substantially cylindrical space inside leg 102A and preferably centrally located within it, is placed inner conductor 104. This conductor 104 is insulated from the inner surface of conductor 102A so that it can be used together with conductor 102A, as a radio frequency transmission line. In practice, it is more convenient to locate conductor 104 coaxial with the inner cavity inside conductor 102A. This is usually accomplished by means of insulating beads, such as beads 105 and 106. As a point between the two ends of the U-shaped conductor 102, or at a point between the two ends of the U-shaped conductor 102, that is, at a point intermediate between 102C and 101D, conductor 104 is brought out through a hole in conductor 102A, and is either connected or coupled to conductor 102B. As shown in FIGURE 6, conductor 104 is coupled to conductor 102B. This coupling is accomplished by continuing conductor 104 out through the side of the conductor 102A and through a hole in conductor 102B into the cavity inside conductor 102B, together with conductor 102B, conductor 104 forms a coaxial transmission line with the inner conductor supported by such insulating beads as, for example, beads 105, 106, 107 and 108. The coupled arrangement was found to be preferable to a direct connection of conductor 104 to conductor 102B, particularly when operation over a wide frequency range is desired. It was also found that short pieces of tubing such as 109 and 110, are helpful for preserving the balance. Metal tube 109 is connected to conductors 102A and a similar tube 110 is connected to conductor 102B. These pieces of metal tubing are made of equal lengths and are so arranged that a relatively small insulated gap exists between them. In the case when conductor 104 is coupled to conductor 102A, conductor 104 is arranged to go through these two pieces of tubing, but is insulated from both. When it is desired to connect conductor 104 directly to conductor 102B, it is convenient to solder in a metal plug into tube 110, and to connect conductor 104 directly to this plug.

Conductor 102C and preferably the middle thereof, is connected to inner conductor of a coaxial transmission line, comprising inner conductor 111 which is surrounded by outer conductor 112. The outer conductor 112 of said coaxial transmission line 111, 112, is connected to the short end wall 101C. Two other coaxial transmission lines, conveniently referred to as output lines, are arranged and connected as follows: The outer conductor 113 of one output line is connected to long side 101B of cavity 101. The inner conductor 114 of this line is connected to leg 102B of U-shaped conductor 102. Similarly outer conductor 115 of the second output line is connected to the other side 101A of cavity 101, and the inner conductor 106 is connected to leg 102 of the U-shaped conductor 102. The output transmission lines are preferably arranged and connected at equal distances from short walls 101D of cavity 101.

As the bridge network of FIGURE 6 is to be used preferably over wide frequency range, it is beneficial to add a longitudinal metal rib 117 which extends substantially along the center line of the cavity and is metallically bonded to the bottom 101E of the cavity and preferably also to the top 101F of the cavity, thus dividing the cavity almost into two equal cavities. The electrical effect of such a rib is to decrease the characteristic impedance of conductors 102A and 102B, with respect to the walls of the cavity for the unbalanced mode, which is excited, for example, when power is supplied to terminal II, that is, to coaxial transmission lines 111, 112. While the effect of the rib is to decrease the characteristic impedance for the unbalanced mode, it does not greatly change the characteristic impedance of conductors 102A and 102B for the balanced mode particularly when the rib is fairly thin.

The hybrid thus described is suitable for the operation of the present invention. However other modifications of the hybrid such as shown in the above mentioned application may be adapted for the present invention. The hybrids 5 and 6 are chosen to present equal resistances R, to the outputs 80 and 81. When two such equal resistances R, are connected to the phase splitter, the relative phases of the currents in the two branches are $\phi_1$ and $\phi_2$, which are given by $$\tan \phi_1 = \frac{L\omega}{R} \tan \phi_2 = \frac{-1}{RC\omega} \quad (1)$$

when $$\tan \phi \tan \phi_2 = -1 \quad (2)$$

and $$\phi_1 - \phi_2 = 90° \quad (3)$$

This condition is satisfied when $$R = \sqrt{\frac{L}{C}} \quad (4)$$

While the relative magnitudes of the two components $E_R$ and $E_{R'}$ of the reference voltage $V_R$ do not remain equal, as the frequency is varied, the orthogonal phase relationship is substantially independent of frequency.

The property of the hybrid as described in my copending application is such that input voltages to the parallel feed P will appear at load terminals I and II in equal magnitude and phase, while inputs to the series feed S will appear at the load terminals I and II in equal magnitude but opposite phase. Thus in the present invention the side branches or load terminals I and II of hybrid 5 are connected to two equal crystal rectifiers 7 and 8. Similarly the load terminals I and II of hybrid 6 are connected to crystal rectifiers 9 and 10. The rectifier pairs 7 and 8, and 9 and 10 are connected in opposition through the primaries of transformers 11 and 12. In the preferable form of operation of the present invention, a voltage ½ v. is applied to the series input S of each hybrid. The use of ½ v. is due to the use of a matching pad for avoiding a standing wave in the line. This matching pad provides a matching impedance between the input and the hybrid. The relationship of the resistors and impedances in the matching pads and the balance rectifiers is indicated in the drawings. The use of a matching pad is preferred although other impedance matching means may of course be used. When such voltage ½ v. is applied to each of the inputs S and S′ of hybrids 5 and 6 respectively, a voltage will be developed in each of the branches I, II and I′, II′, of hybrids 5 and 6 respectively, as is indicated in the vector diagram of FIGURES 3 and 4. In FIGURE 3 and FIGURE 4, the long vectors $\overline{E}_R$ and $\overline{E}'_R$ represent the reference voltages developed in branches or load terminals I, II, and I′, II′, as a result of the reference potentials applied at P and P′ of the hybrids, 5 and 6, respectively. The vectors $E_u$ and $-E_u$ are those developed in branches I, II, and I′, II′, as a result of application of voltage ½ v. at each of the terminals S and S′. When therefore both $|\overline{E}_R|$ and $|\overline{E}'_R|$ are much greater than $|E_u|$, the resultant voltages $T_1$, $T_2$, $T_3$ and $T_4$ in branches I, II, I′, II′, are determined by the following approximate equations.

$$T_1 = \overline{E}_R + E_u \cos \alpha$$
$$T_2 = \overline{E}_R - E_u \cos \alpha$$
$$T_3 = \overline{E}'_R + E_u \sin \alpha$$
$$T_4 = \overline{E}'_R - E_u \sin \alpha$$

The potential applied to rectifiers 7 and 8 to the primary of transformer 11 is therefore $T_1-T_2=|2E_u|\cos\alpha$.

The potential applied through rectifiers 9 and 10 to the primary of transformer 12 is $T_3-T_4=2|E_u|\sin\alpha$. It is thus seen that the potential applied across the primaries to the output transformers 11 and 12 are the X and the Y components of the vectors $2E_u$. The angle $\alpha$ which vector $E_u$ makes with the X axis is equal to the relative phase between the voltages $E_u$ and $E_R$ as compared with branch I of hybrid 5. It is also to be noted that the voltage $E_R$ is cancelled in the primary of the transformer as indicated in the above equation and thus the magnitude of $E_R$ is unimportant provided it is large compared with the unknown voltage.

As it is more convenient to amplify small A.C., rather than small D.C. voltages, it is desirable to pass the radio frequency signal to be displayed through a modulator. Such a use and method of operation is shown in FIGURES 1 and 2.

In FIGURE 1 the modulator is shown at M. In FIGURE 2 a hybrid 13 is utilized as a modulator. Modulation is obtained in this circuit by alternately short circuiting and open circuiting the load terminals 83 and 84 by a mechanical chopper 85 or by means of two D.C. controlled biased crystals. When the load terminals 83 and 84 of the hybrid 13 are alternately short circuited and open circuited, the signal fed to the input will pass through the hybrid unimpeded but will be subject to alternate phase reversal. In place of the hybrid 13 a balanced modulator may be used, but a hybrid phase reversing device such as described is convenient. When the phase of the voltage $V_0 e^{j\phi}$ is alternately reversed by such a hybrid, the voltages applied to the primaries of transformers 11 and 12 are also alternately reversed so that across the terminals 14 and 15, 16 and 17, of the secondaries of transformers 11 and 12, square waves are developed. The amplitudes of these square wave voltages appearing across terminals 14, 15, and 16, 17, are respectively proportional to the X and Y components of $E_u$.

The output of transformers 11 and 12 may be connected to the D.C. amplifiers supplying respectively vertical and horizontal deflection plates of a cathode ray tube. The arrangements comprising capacitors 18, 18' and synchronous relays 19, 19', make it possible to obtain two spots on a so-called D.C. oscilloscope screen. One of these spots indicates the origin from which vector V is measured. The second spot indicates the end of vector V (the arrow end of the vector). The relays 19, 19' are operated synchronously with the modulating hybrid 13, and in particular in such a way that the potential across terminals 22, 23 and 22' and 23' is zero, during say the lower portion of the square wave. The potential across terminal 22, 23, and 22' and 23' during the upper portion of the square wave is substantially equal to total swing of the square wave.

The combination of resistance 21 and capacitor 20 is used to correct the low frequency response.

The circuit section 88 is illustrative of a means for varying the frequency of the unknown voltage while maintaining a constant reference voltage so that usual observation of phase and magnitude changes in the unknown radio frequency voltage may be made while the frequency of the source is varied.

At lower radio frequencies, balanced detectors as illustrated in FIGURE 5 may be substituted for the hybrids 5 and 6. As illustrated in FIGURE 5 the reference voltage is applied through the coaxial cable 90 to the primary of the transformer 91. The secondary of the transformer is connected between the center tap on the secondary of transformer 92 and primary of output transformer 94. The unknown voltage is fed through the primary of transformer 92. The output of the secondary of transformer 92 is connected to terminals I and II corresponding with the load terminals of the hybrids. These terminals are connected in turn to rectifiers 95 and 96 corresponding with rectifiers 7 and 8 of FIGURES 1 and 2. The various lines schematically illustrated are preferably coaxial transmission lines.

Having now described my invention, I claim:

1. A means for determining relative phase and magnitude of a radio frequency voltage comprising a pair of hybrids, each having parallel and series feeds and a pair of load terminals, means for feeding said voltage and a reference voltage to individual feeds with the reference voltage being fed to feeds in each of said hybrids in 90° phase relation to one another, and means for deriving from all the load terminals of said hybrids, outputs proportional to vector components of said radio frequency voltage.

2. A means as set forth in claim 1, wherein said outputs are proportional to mutually perpendicular vectors of said radio frequency voltage and are adapted to operate the deflection plates of a cathode ray oscilloscope.

3. A means for determining relative phase and magnitude of a radio frequency voltage comprising a pair of hybrids, each having parallel and series feeds and a pair of load terminals, means for feeding said voltage to said series feeds, means for feeding a reference voltage to each of said parallel feeds in 90° phase relation and means for deriving from all the load terminals of each hybrid, voltages proportional to vectors of said radio frequency voltage adapted to be applied as vector components to a detecting mechanism.

4. A means as set forth in claim 3, wherein said voltages proportional to vectors of said radio frequency voltage are applied to the horizontal and vertical deflecting mechanisms of an oscilloscope to obtain a polar representation of relative phase and magnitude of said radio frequency voltage.

5. A means for determining relative phase and magnitude of a radio frequency voltage comprising a pair of hybrides, each having parallel and series feeds, and a pair of load terminals, means for feeding said voltage to said parallel feeds, means for feeding a reference voltage to each of said series feeds in 90° phase relation, and means for deriving from all the load terminals of each hybrid, voltages proportional to vectors of said radio frequency voltage adapted to be applied as vector components to a detecting mechanism.

6. A means as set forth in claim 1, wherein said means for deriving outputs from the load terminals comprises transformers having their primaries connected across the load terminals of said hybrids whereby the reference voltage components appearing at said load terminals will be cancelled and the radio frequency voltage components will be summed.

7. A means as set forth in claim 1, wherein one of said voltages fed into a hybrid passes through a modulating means, whereby alternating voltage output signals are derived.

8. A means as set forth in claim 7 wherein said signals are applied to the horizontal and vertical deflection plates of an oscilloscope through a relay means synchronously operating with said modulating means whereby a pair of spots indicating respectively the ends of the unknown voltage vector are reproduced on the screen of the oscilloscope.

9. Apparatus for determining the phase and magnitude of an unknown signal relative to a reference signal comprising, first and second hybrids, each having a series feed input, a parallel feed input and a pair of side terminals, means for applying equal magnitude quadrature components of one of said signals respectively to ones of said first and second hybrid inputs, means for applying equal magnitude in phase components of the other of said signals respectively to the others of said first and second hybrid inputs, and means for combining the output signals from said first and second hybrid side terminal pairs to provide an output signal representative of the phase and magnitude of said unknown signal with respect to said reference signal.

10. Apparatus in accordance with claim 9 wherein said one signal is said reference signal, said ones of said first and second hybrid inputs are said parallel feed inputs, said other signal is said unknown signal, and said others of said first and second hybrid inputs are said series feed inputs.

11. Apparatus in accordance with claim 9 and further comprising, a balanced rectifying and clamping circuit coupling each pair of side terminals to said combining means.

12. Apparatus in accordance with claim 9 and further comprising, means for coupling the output signal from each side terminal pair to said combining means which coupling means includes a transformer with its primary coupled between said side terminals, whereby said reference signal components are canceled to provide an output signal across the secondary of said transformer proportional to the magnitude of said unknown signal.

13. Apparatus in accordance with claim 9 and further comprising, means for modulating one of said signals applied to said hybrids to provide A.-C. output signals for delivery to said combining means.

14. Apparatus in accordance with claim 13 and further comprising, relay means operated in synchronism with said modulating means for delivering signals to the vertical and horizontal deflection plates of an oscilloscope, whereby a pair of spots may be produced on the oscilloscope defining a line segment therebetween whose magnitude and orientation is representative of the phase and magnitude of said unknown signal.

15. Apparatus in accordance with claim 9 and further comprising, means for sweeping the frequency of said unknown and reference signals over a prescribed frequency range.

16. Apparatus for determining the phase and magnitude of an unknown signal relative to a reference signal comprising, a source of a radio frequency signal, a circuit energized by said radio frequency signal to provide said reference and unknown signals, first and second hybrids each having a series feed input, a parallel feed input and a pair of side terminals, means for applying substantially equal magnitude time quadrature components of said reference signal respectively to ones of said series feed and said parallel feed inputs, means for modulating said unknown signal at a low frequency, means including an impedance matching device for coupling said modulated unknown signal jointly to the others of said series feed and parallel feed inputs to minimize reflections at said others inputs, the amplitude of the signal applied to said others inputs being much smaller than that applied to said ones inputs, balanced detectors energized by each pair of side terminals for providing respective demodulated unknown signal jointly to the others of said series cally related to said low frequency and including means synchronized with said modulating means for providing a pair of output signals representative of quadrature components of the vector relationship between said unknown and reference signals.

17. Apparatus for providing a representation of the phase and magnitude of an unknown impedance at a prescribed frequency comprising, a first hybrid network having an input, an unknown output, a reference output and a pair of side terminals, a standard impedance coupled to one of said side terminals, said unknown impedance being coupled to the other, a source of a signal of said prescribed frequency coupled to said first network input whereby a reference signal is provided at said reference output and an unknown signal is provided at said unknown output, the phase and magnitude of said unknown signal with respect to said reference signal being the same as the phase and magnitude of said unknown impedance with respect to said standard impedance at said prescribed frequency, a pair of hybrids each having a series feed input, a parallel feed input and a pair of side terminals, means for applying substantially equal magnitude time quadrature components of one of said signals respectively to ones of said first and second hybrid inputs, means for applying equal magnitude in phase components of the other of said signals respectively to the others of said first and second hybrid inputs, and means for combining the output signals from said pair of hybrids side terminal pairs.

18. Apparatus for providing a representation of the phase and magnitude of an unknown impedance at a prescribed frequency comprising, a first hybrid network having an input, an unknown output, a reference output and a pair of side terminals, a standard impedance coupled to one of said side terminals, said unknown impedance being coupled to the other, a source of a signal of said prescribed frequency coupled to said first network input whereby a reference signal is provided at said reference output and an unknown signal is provided at said unknown output, the phase and magnitude of said unknown signal with respect to said reference signal being the same as the phase and magnitude of said unknown impedance with respect to said standard impedance at said prescribed frequency, a pair of hybrids each having a series feed input, a parallel feed input and a pair of side terminals, means for applying substantially equal magnitude time quadrature components of said reference signal respectively to said parallel feed inputs, means for modulating said unknown signal at a low frequency, means including an impedance matching device for coupling said modulated unknown signal jointly to said series feed inputs to minimize reflections at said series feed inputs, the amplitude of the signal applied to said series feed inputs being much smaller than that applied to said parallel feed inputs, balanced detectors energized by each pair of side terminals of said pair of hybrids for providing respective demodulated output signals having spectral components harmonically related to said low frequency and including means synchronized with said modulating means for providing a pair of output signals representative of quadrature components of the vector relationship between said unknown and reference signals.

19. Apparatus for providing a signal representative of the vector impedance of an unknown load at a prescribed frequency comprising, a hybrid having a parallel feed input, a series feed input, and a pair of side terminals, a source of an input signal of said prescribed frequency, a standard load having a known vector impedance at said prescribed frequency, means for coupling said unknown load and said standard load to respective ones of said side terminals, means for coupling said input signal to one of said series feed and said parallel feed inputs to provide an impedance signal at the other of the last-mentioned inputs whose magnitude is representative of the magnitude of the reflection coefficient of said unknown load with respect to said standard load and whose phase with respect to that of said input signal is representative of the phase of said deflection coefficient, means responsive to said input signal for providing a reference signal, and means for combining said impedance signal and said reference signal to provide an output signal representative of the vector impedance of said unknown load.

References Cited in the file of this patent

UNITED STATES PATENTS

| | | |
|---|---|---|
| 2,135,171 | Chireix | Nov. 1, 1938 |
| 2,406,858 | Shepherd | Sept. 3, 1946 |
| 2,421,747 | Engelhardt | June 10, 1947 |
| 2,454,915 | Earp | Jan. 27, 1948 |
| 2,465,355 | Cook | Mar. 29, 1949 |
| 2,554,164 | Wojciechowski | May 22, 1951 |

(Other references on following page)

UNITED STATES PATENTS

| | | |
|---|---|---|
| 2,568,927 | Morrison | Sept. 25, 1951 |
| 2,570,139 | Maxwell | Oct. 2, 1951 |
| 2,596,288 | Robertson | May 13, 1952 |
| 2,616,951 | Moreno | Nov. 4, 1952 |
| 2,650,347 | Gaffney et al. | Aug. 25, 1953 |
| 2,736,864 | Sinclair et al. | Feb. 28, 1956 |
| 2,751,429 | Schlesinger | June 19, 1956 |
| 2,751,554 | Schlesinger | June 19, 1956 |
| 2,762,949 | Huffman | Sept. 11, 1956 |
| 2,790,143 | Kyhl | Apr. 23, 1957 |
| 2,793,343 | Wagner | May 21, 1957 |
| 2,805,392 | Schnoll | Sept. 3, 1957 |
| 2,807,750 | Hobbs | Sept. 24, 1957 |
| 2,813,250 | Tyson | Nov. 12, 1957 |

OTHER REFERENCES

"Simplified Vectorscope," article in Electronics, September 1953, pages 180–182.

"Transmission Line Hybrids," published by Alford Mfg. Co., Inc., 299 Atlantic Ave., Boston, Mass.; copyright 1955.

UNITED STATES PATENT OFFICE
CERTIFICATE OF CORRECTION

Patent No. 3,061,780            October 30, 1962

Chester B. Watts, Jr.

It is hereby certified that error appears in the above numbered patent requiring correction and that the said Letters Patent should read as corrected below.

Column 6, line 37, for "hybrides" read -- hybrids --; column 7, line 49, for "of", first occurrence, read -- to --; lines 55 and 56, strike out "unknown signal jointly to the others of said series cally", and insert instead -- output signals having spectral components harmonically --; column 8, line 59, for "deflection" read -- reflection --.

Signed and sealed this 14th day of May 1963.

(SEAL)
Attest:

ERNEST W. SWIDER            DAVID L. LADD
Attesting Officer            Commissioner of Patents